Figure 1:
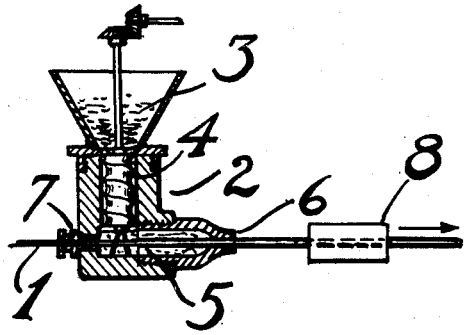

Dec. 31, 1940.    W. H. SMYERS    2,226,590
INSULATED ELECTRIC CONDUCTOR
Filed Oct. 20, 1937

William H. Smyers Inventor
By P. L. Young Attorney

Patented Dec. 31, 1940

2,226,590

UNITED STATES PATENT OFFICE 2,226,590

INSULATED ELECTRIC CONDUCTOR

William H. Smyers, Westfield, N. J., assignor to Standard Oil Development Company, a corporation of Delaware Application October 20, 1937, Serial No. 170,048

9 Claims. (Cl. 174—121)

This invention relates to improved insulated electric conductors and novel methods of manufacturing same and is a continuation-in-part of applications Serial No. 670,730 filed May 12, 1933, and Serial No. 704,747 filed December 30, 1933.

Broadly, the invention comprises electric conductors insulated with novel compositions having improved electrical, physical and chemical properties and comprising essentially rubber or rubber-like materials in conjunction with high molecular weight, substantially saturated, plastic and/or elastic hydrocarbon polymers such as high molecular weight polymerized isobutylene (having a molecular weight of 80,000).

It is a primary object of the present invention to prepare electric conductors insulated with compositions of high dielectric strength, high insulation resistance, low specific inductive capacity and low power factor, while at the same time possessing high resistance to ozone and attack by other chemical agents such as oxidation, acids, alkalies, etc., and at the same time having good physical properties such as high resistance to moisture while yet having satisfactory tensile strength, firmness, softening point and cold flow properties.

In preparing the insulating composition, the rubber to be used may be crude rubber such as pale crepe, smoke sheet (ribbed or unribbed), masticated or milled rubber, etc. which may be derived from any suitable source such as India, Pará, etc. Also, some of the natural rubber-like materials or rubber substitutes may be used such as balata, gutta percha, etc., although it is frequently best to use a mixture, regulating the proportions so as to best take advantage of the more elastic properties of the rubber and the harder properties of gutta percha, and the like. Likewise, instead of natural rubber, one may use synthetic rubber substitutes such as polymerized diolefines, e. g. butadiene, isoprene, chlorprene, etc., which have been polymerized to rubber-like consistency. In some cases, it is also advisable to use mixtures of the natural rubber or rubber-like materials with the synthetic rubber, for instance, to take advantage of the high resistance to abrasion which characterizes the polymerized butadiene rubber made under certain known conditions.

The saturated polymer, which, according to the present invention, is to be compounded with the above-described rubber or rubber-like material, is preferably made by polymerizing olefines, particularly iso-olefines and especially iso-olefines having the general formula $R(R')C:CH_2$ in which R and R' represent the same or different alkyl groups having from 1 to about 4 carbon atoms, such as isobutylene, 2-methyl butene-1, etc., at temperatures below —10° C., e. g. —20° C., —50° C., or even —100° C., in the presence of an active inorganic halide of the Friedel-Crafts type, preferably boron fluoride, and preferably in the presence of a suitable diluent or solvent for the iso-olefine being polymerized. Although boron fluoride is the preferred catalyst, one may also use boron fluoride charged with hydrofluoric acid, phosphorus trifluoride, phosphorus pentafluoride, etc., or other solid inorganic halides, e. g. aluminum chloride, preferably nascent aluminum chloride as is formed by allowing hydrogen chloride to act on aluminum, or solutions or double compounds of said halides. Also, other catalysts may be used, such as active clays. The diluent or solvent to be used may be purified ethylene or other low-boiling liquefied gaseous hydrocarbons, e. g. propane, butane, ethane or even methane or mixtures thereof. This diluent may be used and re-used many times.

The polymer produced by this polymerization process has a molecular weight which may be regulated by the process of manufacture, for example, ranging from about 2,000 or 3,000 up to 10,000 or 15,000 for a plastic and somewhat sticky polymer, or ranging from about 50,000 to 300,000 or more for an elastic, non-tacky polymer substantially free from tendency toward cold flowing at ordinary room temperature. The higher molecular weight products are obtained by using substantially pure isobutylene and a very low temperature and preferably carrying out the polymerization in the presence of purified ethylene as a solvent. It is particularly important in preparing the extremely high molecular weight polymers that the starting materials should be free from sulfur compounds and other substances which act as poisons for the linear type polymerization. After the polymerization has been completed, the temperature is allowed to rise to room temperature, and the product is washed with water or an aqueous solution of caustic soda or other suitable agent in order to free it of any remaining catalyst.

The resulting product is a plastic or elastic solid which is substantially saturated in respect to hydrogen, having an iodine number at least below 5 and generally below 1, and colorless, if care be taken to avoid the presence of colored bodies. These polymers are greatly resistant to oxidation and attack by ozone or various other chemicals such as sulfuric acid, nitric acid, etc., or alkalies such as caustic soda and the like, and are also resistant to penetration by water, moisture, etc. These polymers are extremely durable in that they are non-volatile and non-hardening as well as highly resistant to weathering. They are soluble in the normally liquid petroleum hydrocarbons such as naphtha, mineral lubricating oils, as well as liquefied normally solid petroleum hydrocarbons such as paraffin wax, petrolatum, and asphalt, and when dissolved in any of these materials have the property of increasing the viscosity thereof and decreasing the temperature coefficient of viscosity thereof which means reducing the amount of change in viscosity with any given change in temperature.

If desired, the polymerized product may be separated into fractions having different molecular weights either by extraction or selective precipitation, using solvents such as methane, propane, naphtha, benzol, acetone benzol, etc., at the proper temperature to make the desired separation. In this way the polymers having any desired average molecular weight, such as about 100,000, may be separated from those having a substantially lower or higher molecular weight.

In compounding the rubber with the saturated polymers just described, other addition agents may be added in order to obtain precisely the desired combination of physical properties of firmness, softening point, cold flow, etc. For instance, waxes, preferably hydrocarbon waxes such as paraffin wax or ceresin wax, or natural or synthetic resins, preferably a hydrocarbon resin derived from cracking coil tar or other resin soluble in or compatible with the saturated polymer described, may be added to increase the hardness of the composition. Also, if desired, a softer material, such as petroleum or viscous lubricating oil fractions, may be used in small amounts to plasticize or soften the composition.

The electric conductor to be insulated may consist of wires or cables of either the solid, stranded or braided types or may be metal in flat or curved sheet forms such as used in the construction of condensers and the like. The conductors may be composed of the usual metals such as copper, aluminum, silver or alloys thereof, or they may consist of a thin deposit or coating of a metal having a high electric conductivity on a metal having a lower electric conductivity such as a copper wire electroplated with silver or iron wire electroplated with copper, or iron or steel wire with an outer layer of extruded aluminum. Also, if desired, the electric conductor may have already been given an insulated coating of enamel or particularly in the case of aluminum it may have been subjected to an oxidizing treatment in order to coat the aluminum conductor with a film of aluminum oxide which serves as insulation.

In carrying out the present invention, the insulating composition comprising rubber and saturated polymer, hereinafter referred to for the sake of brevity as the rubber-polymer composition, may be compounded in a number of different ways. For instance, the rubber and saturated polymer (together with any consistency modifiers such as waxes, resins or oils, if desired) may be mixed together on steel rolls such as are used in the ordinary rubber mill or they may be kneaded together in a suitable apparatus such as the Banbury mixer or the composition may be built up by laminating together one or more layers of the rubber and polymer. However, the preferred method of compounding these materials is by the method described in application 704,747 which discloses dissolving, for example, 1 to 10% of an isobutylene polymer in gasoline and swelling rubber (in the form of finely divided particles or small pieces, preferably having a thickness not greater than about ⅛" or 2 or 3 millimeters) in the resultant solution. The rubber is allowed to swell until the particles of rubber have become flabby and jelly-like in texture but not sufficiently that they break down and lose their inherent colloidal structure. When the swelling has proceeded to the desired extent, any residual unabsorbed solution of the polymer and gasoline is preferably removed by decantation, filtration, and/or washing with fresh gasoline and the residual swollen jelly-like particles of rubber aggregates may be agitated sufficiently to produce a substantially homogeneous and smooth viscous composition. A slight mechanical comminution in any suitable manner (as by forcing the composition through a 1/16" wire mesh screen) may be used, if desired.

When the resulting viscous composition is allowed to evaporate, the residual, dry, rubber-polymer composition is found to be a homogeneous mixture of the high molecular weight saturated hydrocarbon polymer intimately and uniformly or homogeneously dispersed within the colloidal particles or cells of the rubber. The true homogeneity of this composition is a distinct advantage over similar compositions prepared by mere mechanical mixing and also over compositions prepared by separately dissolving or swelling each of the constituents in a volatile solvent, mixing the two solutions and evaporating the mixture.

In the above-described preferred method, the colloidal cell walls of the rubber tend to prevent any migration or cold flowing of the saturated polymer and, in fact, the polymer and the rubber appear to mutually protect each other because the polymer being so truly uniformly and intimately dispersed within the rubber colloid particles serves to protect the latter from oxidation and deteriorating effects of moisture, oxidation, ozone, or other chemical influences.

Compositions prepared according to this invention, particularly by the preferred method just described, possess a number of properties which are particularly useful and advantageous in the construction of insulated electric conductors. They are superior to either constituent when used alone for the rubber alone tends to oxidize and harden with age and is particularly susceptible to the deteriorating effects of ozone while, on the other hand, the saturated polymer alone cannot be vulcanized like rubber and does not in itself have sufficient mechanical strength, e. g. tensile strength, firmness, etc., to withstand the mechanical handling and the resistance to radial displacement by the electric conductor proper. Furthermore, the saturated polymer is relatively expensive compared to the rubber and also the polymers having a molecular weight substantially below 50,000 have a relatively high tendency toward cold flowing. The rubber-polymer insulation, however, possesses both suitable mechanical strength because the rubber can be vulcanized and has extremely high dielectric strength and high insulation resistance as well as low specific inductive capacity and power factor due to the intimate and homogeneous presence of the saturated polymer. The rubber, particularly when compounded by a preferred method by swelling in a volatile solvent solution of the polymer, greatly reduces or totally prevents cold flow and consequently prevents radial displacement of the one or more electric conductors in a cable. The composition is also superior to compositions of oil and rubber because its consistency is less affected by changes in temperature.

In carrying out the invention according to the preferred method, i. e. by swelling the rubber in the volatile solvent solution of the saturated polymer, the swelling should be permitted to take place preferably at ordinary room temperature or, in any case, at a temperature below that at which substantial amounts of the rubber go into solution or lose their colloidal structure. The temperature should generally be maintained below 50° C., although if it is desired to hasten the swelling a slightly higher temperature, up to about 80° C., may be used by carrying out the operations under sufficient pressure to prevent evaporation of the solvent and by rapidly cooling the mixture before the rubber has dissolved or lost its colloidal structure. Instead of using gasoline or naphtha, any other suitable volatile liquids may be used which act only as swelling agents and not as solvents under the particular conditions of use. For instance, under some circumstances, benzol, toluol, or other aromatic or mixed aliphatic and aromatic hydrocarbons may be used, as well as certain esters, ethers, ketones, and chlorine derivatives of hydrocarbons. In many cases, the solvent action of a liquid may be reduced and converted into a swelling action by dissolving therein another liquid which is a non-solvent for the rubber.

If non-volatile ingredients other than the high molecular weight saturated polymer are to be incorporated in the rubber-polymer composition by the swelling method, such materials should preferably be soluble in the naptha or other liquid which is to be used as a swelling agent for the rubber and they should preferably be dissolved in the naphtha along with the saturated polymer before the rubber is added. For example, up to 10 or 15% or more of a wax such as paraffin wax, or of a resin such as a normally hard brittle resin derived from cracking coil tar, may be dissolved in the naphtha along with from 1 to 10 or 15% or more of polymerized isobutylene and 5 to 15% of the rubber swelled in the solution (the gasoline representing the balance of the 100%).

vided solids such as carbon black may be mechanically mixed into the composition before or after the swelling of the rubber colloid or any other time before evaporation of the solvent. If desired, after evaporation of the solvent, such compositions may also be vulcanized by exposing the residual rubber-polymer composition to the vapors of a vulcanizing agent such as sulfur monochloride or dichloride or by immersing them in such compounds in a liquid state.

When it is desired to vulcanize rubber-polymer compositions which have been prepared by mechanical milling or kneading, the simplest procedure is to incorporate the sulfur or other vulcanizing agent along with suitable vulcanization accelerators directly into the composition during the mechanical mixing and then vulcanizing the composition after it has been placed in its proper position on the electric conductor to serve as insulator therefor. An example of a composition for this purpose is:

| | Percent by weight |
|---|---|
| Rubber | 60 |
| Polymerized isobutylene (80,000 mol. wt.) | 37 |
| Sulfur | 2 |
| Accelerator | 0.5 |
| Anti-oxidant | 0.5 |
| | 100.0 |

The proportions of materials to be used in preparing these various compositions may vary over a fairly broad range depending upon the particular manner in which the insulation is to be used and depending upon the type of raw materials used and the method of compounding. Usually the final rubber-polymer composition should contain approximately the following amounts by weight of the several constituents:

| Material | General limits | Preferred limits |
|---|---|---|
| | Percent | Percent |
| Rubber (or equivalent) | 30 to 90 | 50 to 75 |
| Saturated polymer | 5 to 60 | 20 to 50 |
| Hardener (e. g. wax, asphalt or resin) | 0 to 30 | 2 to 20 |
| Plasticizer (e. g. viscous mineral oil, etc.) | 0 to 20 | 1 to 10 |

The following table gives some examples of compositions to be used:

| | Example— | | | | |
|---|---|---|---|---|---|
| | 1 | 2 | 3 | 4 | 5 |
| | Percent by weight | Percent by weight | Percent by weight | Percent by weight | Percent by weight |
| Rubber | 70 | 60 | 50 | 60 | 50 |
| Polymerized isobutylene (15,000 m. wt.) | 30 | | | | |
| Polymerized isobutylene (80,000 m. wt.) | | 40 | | 35 | |
| Polymerized isobutylene (150,000 m. wt.) | | | 50 | | 25 |
| Carbon black | | | | | 10 |
| Inorganic filler (e. g. ZnO, etc.) | | | | | 5 |
| Hardener | | | | 5 | 5 |
| Plasticizer | | | | | 5 |

If desired to make the composition fireproof, chlorinated, fluorinated, or other halogenated compounds may be added and also still other ingredients may be added such as amino- or hydroxy-organic (preferably aromatic) compounds or other anti-oxidants, and substances such as certain colored materials or dyestuffs, e. g. azo-benzene, or colorless compounds such as aesculin, quinine, and derivatives thereof, adapted to absorb the actinic rays of light which tend to destroy the rubber and which also tend to depolymerize the saturated polymer. Also, finely di- In applying the above described insulating compositions to the electric conductor, a number of different methods can be used. For instance, the rubber-polymer composition, prepared by milling or kneading (preferably with warming), may be extruded around one or more electric conductors or it may be applied in the manner known as strip covering or wrapping with a jacket or by spiral wrapping. In these latter cases the composition, after suitable milling, is rolled out into thin strips of the proper predetermined thickness and width and then either placed directly on the conductor or stored on rolls from which they may later be rolled onto the conductor.

The wet composition, prepared by swelling the rubber in the volatile solvent solution of the saturated polymer, may be applied to the conductor either by directly immersing the conductor in this wet composition or coating the conductor by contacting it with rolls which dip into the wet composition, and subsequently allowing the solvent to evaporate, or, if desired, applying the wet composition to a paper or cloth fabric which may or may not have been previously impregnated with a suitable insulating medium such as melted paraffin wax or a viscous mineral oil, allowing the solvent to evaporate and then wrapping the dried, coated fabric around the conductor. If desired, the wet composition may be spread onto a smooth polished surface, e. g. metal or glass, in a film of suitable thickness, e. g. ½ to 2 or 3 millimeters, either in the form of large sheets or a continuous band and after allowing the solvent to evaporate, scraping the residual dry rubber-polymer composition off from the polished surface and collecting it either in the form of a film or gathering it together in bulk form, which is then suitable for applying either as extruded tubing, strip covering, or spiral wrapping, as described above for the mechanically mixed composition.

If desired, either this mechanically mixed composition or the dry composition resulting from the swelling method, may be forced into intimate contact with a suitable fabric of paper or textile material by a suitable calendering with heavy and preferably slightly heated steel rolls and then this fabric wrapped around the conductor. If desired, a plurality of layers of this rubber-polymer composition may be applied to the conductor either consecutively or with intermediate layers of other material such as other types of insulation, e. g. plain rubber or gutta percha, jute, fabric wrapping, impregnated paper wrapping, etc.

Another desirable method of using these compositions is to apply them either in the dry or wet state in the form of thin coatings which are adapted (particularly when containing a substantial amount of a thermoplastic hardening agent such as paraffin wax or suitable resins) to soften, when heated to temperatures slightly above normal atmospheric temperatures, and thereby serve as a binder or cementing material between either the conductor and an outer layer of insulation or between two adjacent layers of insulation.

Figure 2:
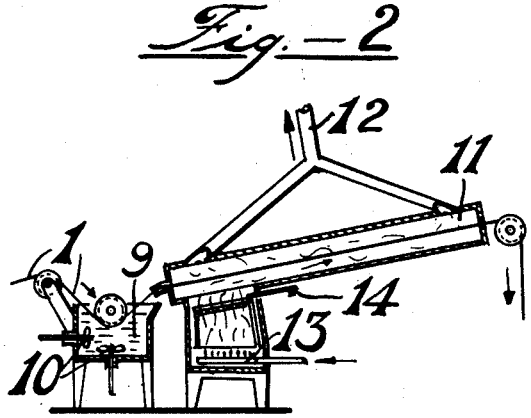
Figure 3:
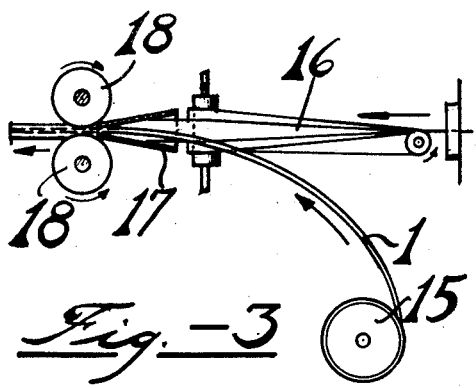
Figure 4:
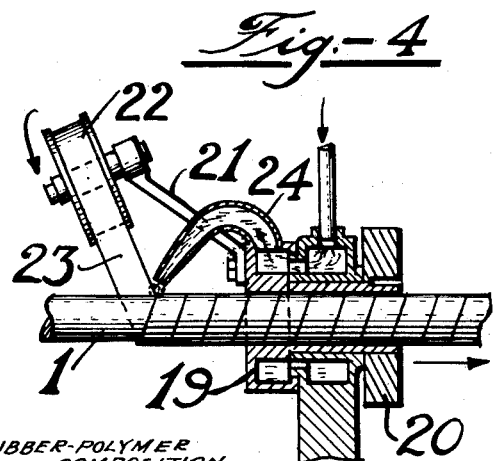

These various methods of applying the insulation to the conductor are illustrated in the accompanying drawings of which Fig. 1 shows applying the rubber-polymer insulation by extrusion, Fig. 2 by dipping and drying, Fig. 3 by strip covering and Fig. 4 by spiral wrapping.

Figure 5:
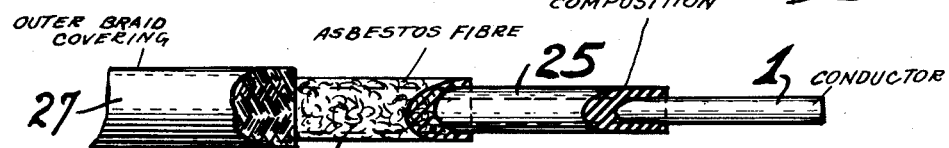
Figure 6:
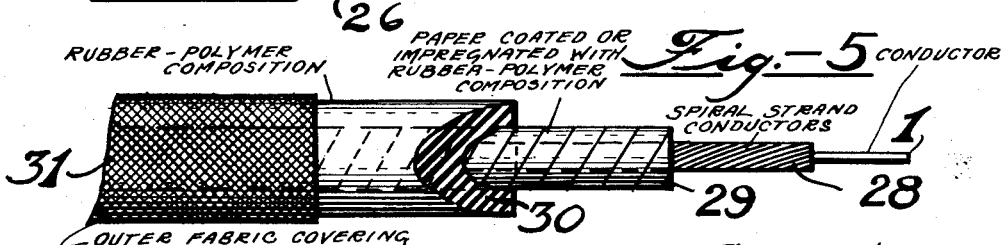

Fig. 5 is an illustration of a wire insulated directly with the rubber-polymer composition and Fig. 6 is an illustration of a stranded cable insulated by a multi-layer spiral wrapping of paper coated with the rubber-polymer insulation.

In Fig. 1 the wire 1 is fed into the extruding machine 2 where the plastic rubber-polymer composition is fed into hopper 3 and is forced by screw conveyor 4 into the pressure chamber 5 from which it is extruded through the die 6 having the desired diameter opening according to the thickness of insulation desired on the wire. A suitable stuffing box 7 prevents the plastic composition from squeezing out at the place where the wire enters the extruding machine. Suitable means 8 may be provided for hardening the extruded insulating composition either by cooling or by vulcanizing or any other suitable means.

In Fig. 2 the wire 1 dips into the tank 9 containing a liquid coating composition prepared by dissolving isobutylene polymer in naphtha and swelling comminuted pieces of rubber in the resulting solution, agitating the mass sufficiently to make a substantially uniform spreadable composition. Suitable agitators 10 insure uniformity in the mass. The coated wire then passes through the drying chamber 11 from which the volatile solvent vapors are drawn off by suction or vacuum through suitable piping 12 and if desired the drying may be accelerated by application of heat through suitable heating means 13 which may be a gas or oil burner or electrical heating means. The drying chamber may be provided with a suitable sliding door 14 for admitting into or excluding from the drying chamber the combustion gases from the burner 13.

In Fig. 3 the wire 1 is unrolled from a suitable reel 15 and it is fed simultaneously with a strip 16 of rubber-polymer composition having the desired insulating thickness into the curved guiding device 17 which rolls the edges of the strip 16 around the wire 1 and leads the covered wire between the rolls 18 which tighten the strip covering around the wire and tend to seal the joint in the strip covering.

In Fig. 4 the wire 1 is fed through the spiral wrapping machine 19 which is rotated about the wire 1 by suitable means such as gear 20 driven by a suitable power gear not shown. The body of the spiral wrapping machine 19 is provided with an arm 21 carrying a suitable reel 22 from which a paper strip 23 coated with rubber-polymer composition is unreeled as the wrapping machine 19 rotates around the wire 1, it being understood of course, that the speed of rotation of this wrapping machine is synchronized with a lonfitudinal motion of the wire through the machine so that the adjacent turns of paper wrapping will abut each other in such a manner as not to leave any unnecessary void spaces. If desired, a suitable liquid thermoplastic composition may be fed from a source not shown through the nozzle 24 so adjusted as to deliver a small amount of sealing composition directly on the joint between adjacent turns of the spiral wrapping paper.

In Fig. 5 a conductor or wire 1 is shown first coated with a rubber-polymer insulating composition 25 which in turn is covered with a layer of asbestos fiber 26 and outer covering of braid 27. In Fig. 6 a core conductor 1 is surrounded by spiral strand conductors 28 to make a stranded cable which is then insulated with a multi-layer wrapping 29 of paper which is coated at least on one side with rubber-polymer composition and preferably also has the body of the paper impregnated with pliable thermoplastic composition such as a low melting point paraffin wax or a mixture of high melting point hydrocarbon wax and petrolatum or a paraffin wax or ceresin wax containing 5 to 50% or 60% of polymerized isobutylene having a molecular weight between about 2,000 and 200,000. This insulated paper wrapping is then further covered by a layer 30 of rubber-polymer composition which may be applied by extrusion or strip covering or any other suitable means, and this coating is in turn covered with an outer protective covering of textile fabric 31 which may or may not be waterproofed as with wax, asphalt, shellac or other suitable material.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. An insulated electric conductor comprising a metallic element insulated by a composition comprising a flexible rubber having a colloidal cellular structure in which an isobutylene polymer having a molecular weight above 2,000 is homogeneously and intracellularly dispersed.

2. An insulated electric conductor as described in claim 1, in which the insulating composition also contains a substantial amount of a paraffinic wax.

3. An insulated electric conductor as described in claim 1, in which the insulating composition also contains a substantial amount of a compatible resin.

4. An insulated electric conductor as described in claim 1, in which said insulating composition is immediately adjacent the metallic element.

5. An insulated electric conductor according to claim 1, in which the isobutylene polymer has a molecular weight between the approximate limits of 2,000 and 50,000.

6. An insulated electric conductor described in claim 1, in which said isobutylene polymer has a molecular weight above about 50,000.

7. An insulated cable comprising at least one metallic electric conductor wrapped with a fabric coated by a flexible adherent coating composition consisting essentially of a flexible rubber and polymerized isobutylene having a molecular weight above 2,000, said coating composition being a non-volatile residue of flexible rubber swelled to a jelly-like mass by an absorbed liquid solution of the polymerized isobutylene in a volatile solvent.

8. An insulated cable comprising at least one metallic electric conductor coated by a flexible adherent coating composition consisting essentially of a flexible rubber and polymerized isobutylene having a molecular weight above 2,000, said composition being a non-volatile residue of a flexible rubber swelled to a jelly-like mass by an absorbed liquid solution of the polymerized isobutylene in a volatile solvent.

9. An insulated cable as described in claim 8, in which said coating composition is vulcanized.

WILLIAM H. SMYERS.